(12) United States Patent
Sone et al.

(10) Patent No.: US 9,705,604 B2
(45) Date of Patent: Jul. 11, 2017

(54) COMMUNICATION DEVICE AND WAVELENGTH ADJUSTMENT METHOD

(71) Applicant: FUJITSU LIMITED, Kawasaki-shi, Kanagawa (JP)

(72) Inventors: Kyosuke Sone, Kawasaki (JP); Setsuo Yoshida, Inagi (JP); Goji Nakagawa, Sagamihara (JP); Shoichiro Oda, Fuchu (JP); Yasuhiko Aoki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/080,939

(22) Filed: Mar. 25, 2016

(65) Prior Publication Data

US 2016/0294479 A1    Oct. 6, 2016

(30) Foreign Application Priority Data

Apr. 1, 2015  (JP) .................................. 2015-075245

(51) Int. Cl.
*H04B 10/079* (2013.01)
*H04B 10/572* (2013.01)
*H04J 14/02* (2006.01)

(52) U.S. Cl.
CPC ..... *H04B 10/572* (2013.01); *H04B 10/07955* (2013.01); *H04J 14/02* (2013.01)

(58) Field of Classification Search
CPC .. H04B 10/572; H04B 10/07955; H04J 14/02
USPC ....................................................... 398/140
See application file for complete search history.

(56) References Cited

U.S. PATENT DOCUMENTS

| 5,920,414 | A | * | 7/1999 | Miyachi | ............... | H04B 10/506 |
|  |  |  |  |  |  | 398/14 |
| 6,154,474 | A | * | 11/2000 | Yoshida | ................ | H01S 5/0687 |
|  |  |  |  |  |  | 372/32 |
| 2003/0223751 | A1 | * | 12/2003 | Shimizu | .............. | H04J 14/0221 |
|  |  |  |  |  |  | 398/79 |
| 2004/0008339 | A1 | * | 1/2004 | Koishi | ................. | G01B 11/272 |
|  |  |  |  |  |  | 356/153 |
| 2006/0045520 | A1 | * | 3/2006 | Nakano | ................ | H04B 10/506 |
|  |  |  |  |  |  | 398/33 |
| 2012/0219289 | A1 | * | 8/2012 | Hayashi | ........... | H04B 10/07955 |
|  |  |  |  |  |  | 398/34 |

(Continued)

FOREIGN PATENT DOCUMENTS

| JP | 2000-078085 | 3/2000 |
| JP | 2006-197489 | 7/2006 |

*Primary Examiner* — Dalzid Singh
(74) *Attorney, Agent, or Firm* — Fujitsu Patent Center

(57) ABSTRACT

A communication device that receives received signal light from another communication device, the communication device includes: a receiver configured to receive signal light output from an optical filter that outputs signal light of a given wavelength included the received signal light; and a transmitter configured to transmit, to the another communication device, a control signal for controlling a wavelength of laser light for use in generation of the signal light of the given wavelength, wherein the receiver is configured to detect power of the signal light output from the optical filter; and the transmitter is configured to set, when the signal light is not successfully received in the receiver, the control signal so as to cause the another communication device to control the wavelength of the laser light, based on the power.

15 Claims, 8 Drawing Sheets

(56) References Cited

U.S. PATENT DOCUMENTS

2014/0161445 A1* 6/2014 Jeong ................ H04B 10/0773
398/34

* cited by examiner

COMMUNICATION DEVICE AND WAVELENGTH ADJUSTMENT METHOD

CROSS-REFERENCE TO RELATED APPLICATION

This application is based upon and claims the benefit of priority of the prior Japanese Patent Application No. 2015-075245, filed on Apr. 1, 2015, the entire contents of which are incorporated herein by reference.

FIELD

The embodiment discussed herein is related to a communication device and a wavelength adjustment method.

BACKGROUND

As mobile traffic increases, traffic in access areas of mobile backhaul networks or the like, which provide connections between portable base stations and the central office, increases.

A related technique is disclosed in Japanese Laid-open Patent Publication No. 2006-197489 or Japanese Laid-open Patent Publication No. 2000-78085.

SUMMARY

According to an aspect of the embodiments, a communication device that receives received signal light from another communication device, the communication device includes: a receiver configured to receive signal light output from an optical filter that outputs signal light of a given wavelength included the received signal light; and a transmitter configured to transmit, to the another communication device, a control signal for controlling a wavelength of laser light for use in generation of the signal light of the given wavelength, wherein the receiver is configured to detect power of the signal light output from the optical filter; and the transmitter is configured to set, when the signal light is not successfully received in the receiver, the control signal so as to cause the another communication device to control the wavelength of the laser light, based on the power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
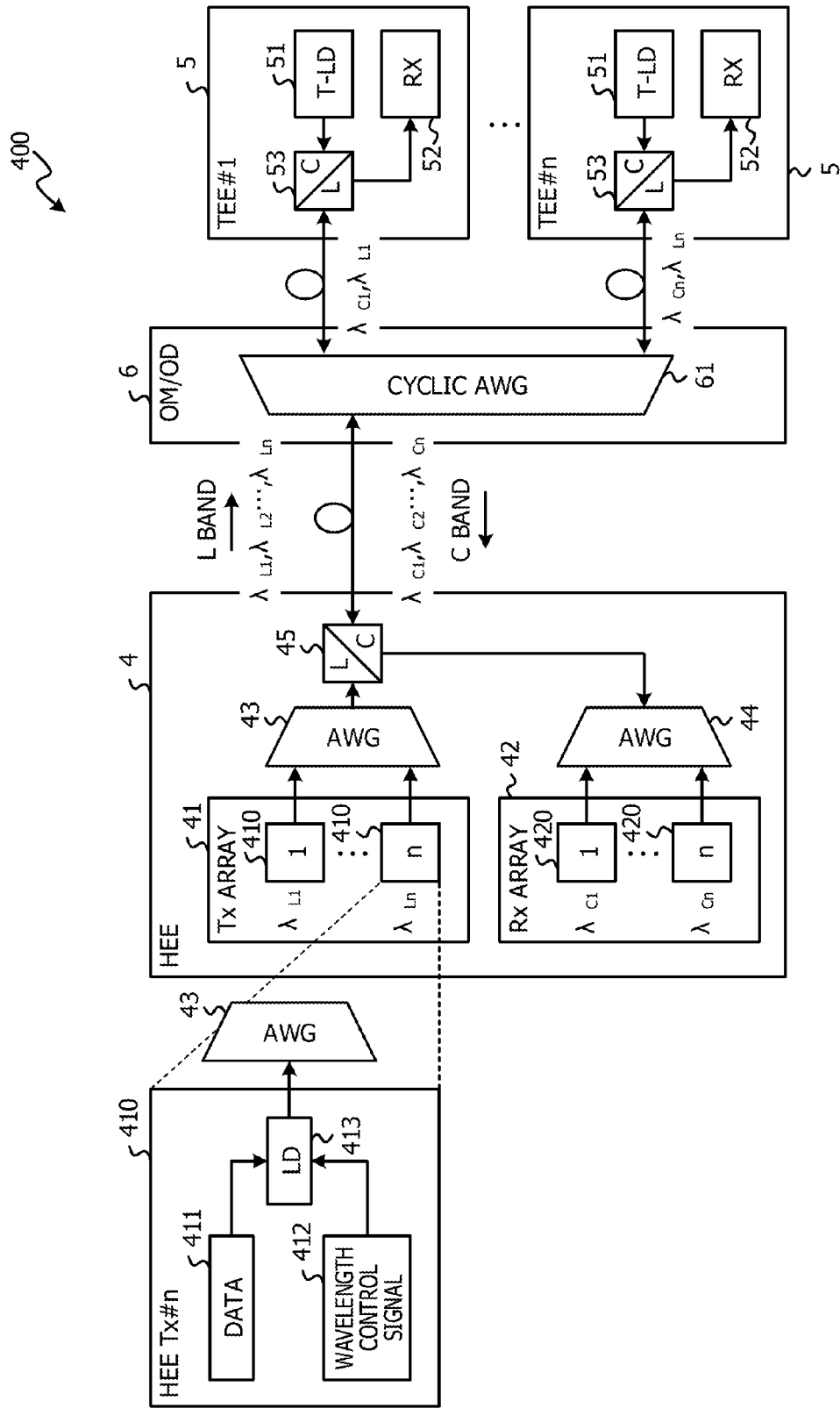
FIG. 1 illustrates an example of a functional configuration of a communication system.

Since traffic in access areas also increases, the dense wavelength division multiplex (DWDM) technology may be applied to the access areas. For example, in G.metro of international telecommunication union telecommunication standardization sector (ITU-T), a wavelength-tunable light source may be used as a transmission light source for use in tail-end equipment (TEE), which is a user device. This provides commonality (reduces types) of TEE to allow simple and low-priced TEE to be manufactured.

The wavelength-tunable light source of each TEE is set to a wavelength suitable for a port of an optical multiplexer/optical demultiplexer (OM/OD) coupled to head-end equipment (HEE), which is a center device, in such a way that a control signal is superimposed on the main signal by the HEE. Such integrated control for wavelength setting may also be applied in a wavelength division multiplex-passive optical network (WDM-PON) system.

For example, in a communication system, when HEE is not able to receive signal light from TEE, the reason for being not able to receive signal light may be considered as being undetermined in the HEE on the center side. For example, in HEE, whether the reason is that no light is output because of a failure in the wavelength-tunable light source of TEE or that a defect has occurred in the wavelength setting may be considered as being undetermined.

For example, each drawing may include, in addition to the components illustrated in the drawing, other functions and so on. Hereinafter, in the drawings, the same portions are denoted by the same reference characters and the description thereof may be omitted.

FIG. 1 illustrates an example of a functional configuration of a communication system. A communication system 400 illustrated in FIG. 1 may be a DWDM system, for example, for optical metro-access and includes HEE 4, n (n being a natural number) pieces of TEE (TEE#1 to #n) 5, and an OM/OD 6. In the communication system 400, upstream communication from the TEE 5 toward the HEE 4 uses a C band, and downstream communication from the HEE 4 toward the TEE 5 uses an L band. One piece of the HEE 4 accommodates n pieces of TEE (TEE#1 to #n) 5 communicatively coupled thereto through the OM/OD 6.

Hereinafter, when one of plural pieces of TEE is specified, the TEE may be denoted as "TEE#1", "TEE#n", or the like, and, when any TEE is called, the TEE may be denoted as "TEE 5". The HEE 4 includes a transmitter array (Tx array) 41, a receiver array (Rx array) 42, arrayed waveguide gratings (AWGs) 43, 44, and a C/L coupler 45. The C/L coupler 45 demultiplexes or multiplexes L-band downstream signal light and C-band upstream signal light.

The AWG 44 divides a C-band upstream DWDM signal into signal light of n wavelengths. The Rx array 42 includes n receivers 420, which correspond to n C-band wavelength grid points $\lambda_{C1}$ to $\lambda_{Cn}$, respectively. A wavelength grid point is a band with a margin with respect to a certain wavelength. The AWG 43 multiplexes n pieces of signal light output from the Tx array 41.

The Tx array 41 includes n transmitters (HEE Tx) 410, which correspond to n L-band wavelength grid points $\lambda_{L1}$ to $\lambda_{Ln}$, respectively. The HEE Tx 410 includes a laser diode (LD) 413. The LD 413 outputs light modulated based on data 411 or a wavelength control signal 412, which is input to the LD 413, to the AWG 43. The data 411 is user data that is transmitted from the HEE 4 to the TEE 5. The wavelength control signal 412 is a signal for controlling the wavelength of an optical signal that is output by a T-LD 51 of the TEE 5.

The OM/OD 6 is communicatively coupled with the HEE 4 and the TEE 5 via optical fibers and includes a cyclic AWG 61. Each of C-band and L-band wavelengths is assigned by one wavelength to each port on the side of the TEE 5 included in the OM/OD 6. For example, a C-band wavelength $\lambda_{C1}$ and an L-band wavelength $\lambda_{L1}$ are assigned to a port that is communicatively coupled with the TEE#1 via an optical fiber. A C-band wavelength $\lambda_{Cn}$ and an L-band wavelength $\lambda_{Ln}$ are assigned to a port that is communicatively coupled with the TEE#n via an optical fiber.

The TEE 5 includes a tunable-laser diode (T-LD; a wavelength-tunable light source) 51, a receiver (Rx) 52, and a C/L coupler 53. The C/L coupler 53 demultiplexes or multiplexes L-band downstream signal light and C-band upstream signal light. The Rx 52 performs reception processing on the data 411 transmitted from the HEE 4.

The T-LD 51 outputs an optical signal of a wavelength corresponding to the coupled port of the OM/OD 6. For this purpose, at the time of, for example, initial coupling of the TEE 5, the HEE 4 transmits the wavelength control signal 412 through the OM/OD 6 to the TEE 5, and, based on the transmitted wavelength control signal 412, the T-LD 51 controls the wavelength of signal light to be output. For example, the HEE 4 integrally controls wavelength setting of the T-LD 51 of each TEE 5.

As the wavelength control signal 412, for example, a signal of a method in which an amplitude modulation (AM) tone or the like is superimposed on signal light, or a signal of a method in which it is integrated, as an overhead portion, into the frame of signal light, may be used. In the communication system illustrated in FIG. 1, when the HEE 4 is not able to receive signal light from the TEE 5, the reason for being not able to receive signal light may be considered as being undetermined in the HEE 4 on the center side. For example, in the HEE 4, whether the reason is that light is not output because of a failure in the T-LD 51 of the TEE 5 or that a defect has occurred in wavelength setting may be considered as being undetermined. Therefore, if the T-LD 51 of the TEE 5 is not in failure and the HEE 4 is not able to receive signal light from the TEE 5 because of wavelength deviation caused by a defect in setting of the T-LD 51, the TEE 5 is replaced. In such a case, there is a possibility that the HEE 4 becomes capable of receiving signal light when the HEE 4 issues an instruction for wavelength setting to the TEE 5. Therefore, inadvertent replacement of the TEE 5 may increase the running costs of the communication system 400.

Figure 2:
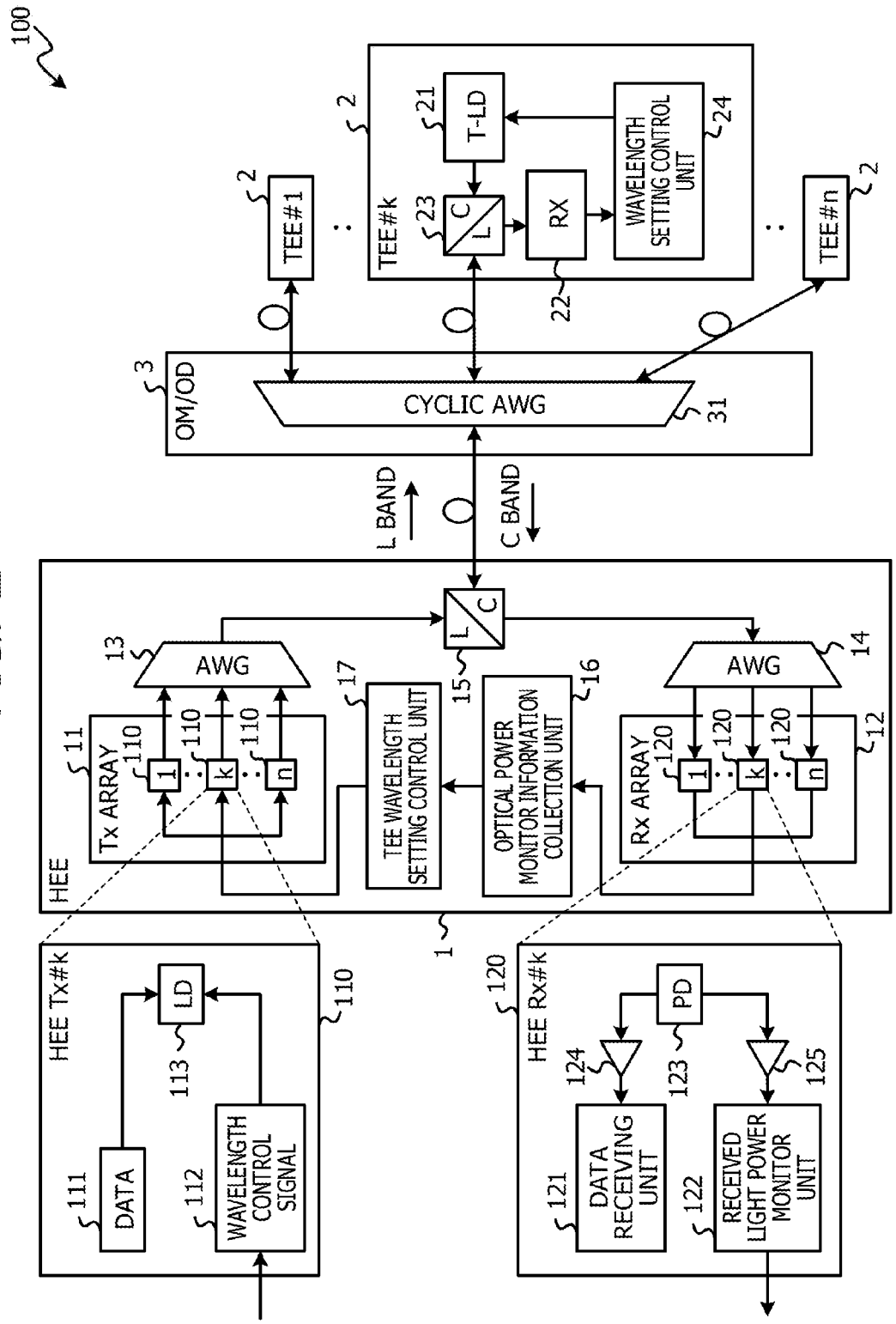
FIG. 2 illustrates an example of a functional configuration of a communication system.

FIG. 2 illustrates an example of a functional configuration of a communication system. A communication system 100 illustrated in FIG. 2 may be a DWDM system, for example, for optical metro access and includes HEE 1, n (n being a natural number) pieces of TEE (TEE#1 to #n) 2, and an OM/OD 3. In the communication system 100, upstream communication from the TEE 2 toward the HEE 1 uses the C band and downstream communication from the HEE 1 toward the TEE 2 uses the L band. One piece of HEE 1 accommodates n pieces of TEE (TEE#1 to #n) 2 that are communicatively coupled thereto through the OM/OD 3.

Figure 3:
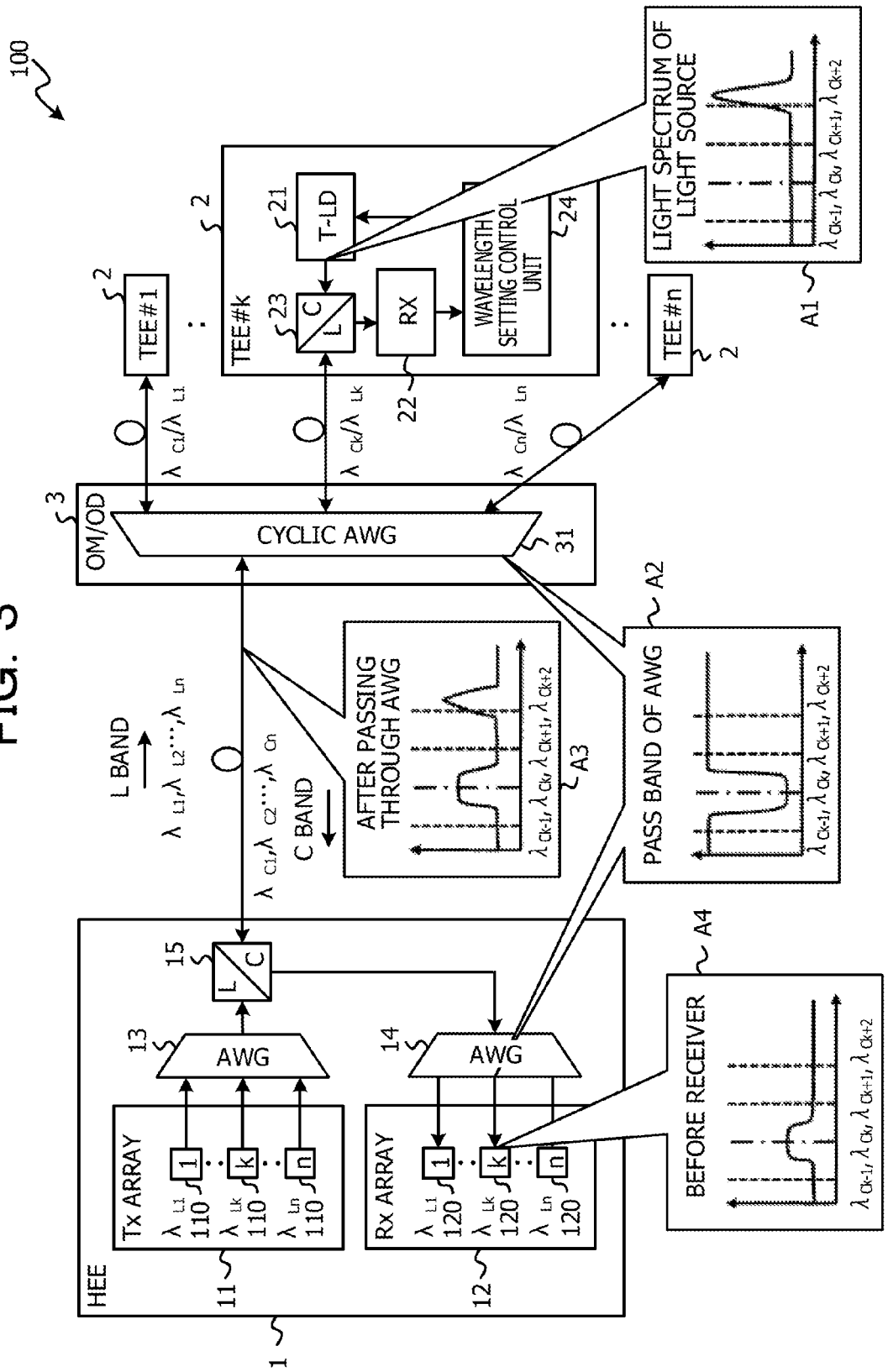
FIG. 3 illustrates an example of wavelength deviation in the communication system.
Figure 4:
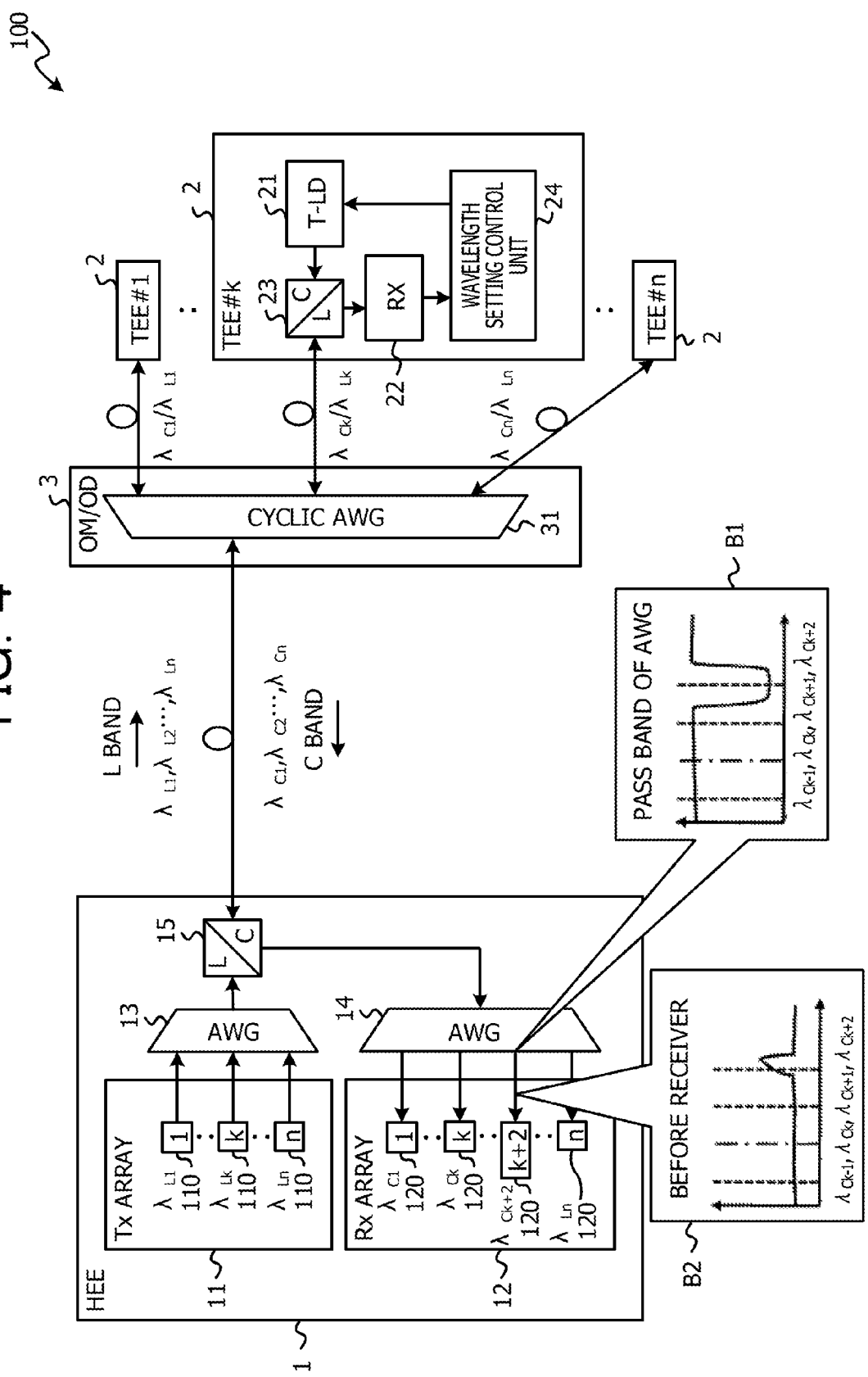
FIG. 4 illustrates an example of wavelength deviation in the communication system.

Hereinafter, when one of a plural pieces of TEE is specified, the TEE is denoted as "TEE#1", "TEE#k, "TEE#n", or the like, and when any TEE is called, the TEE is denoted as "TEE 2". Here, k is a natural number that satisfies 1≤k≤n. The OM/OD 3 is communicatively coupled with the HEE 1 and the TEE 2 via optical fibers and includes a cyclic AWG 31. Each of a C-band wavelength and an L-band wavelength is assigned by one wavelength to each port on the side of the TEE 2 included in the OM/OD 3. For example, as illustrated in FIG. 3 and FIG. 4, a C-band wavelength $\lambda_{C1}$ and an L-band wavelength $\lambda_{L1}$ are assigned to a port that is communicatively coupled to the TEE#1 via an optical fiber. A C-band wavelength $80_{Ck}$ and an L-band wavelength $\lambda_{Lk}$ are assigned to a port that is communicatively coupled to the TEE#k via an optical fiber. A C-band wavelength $\lambda_{Cn}$ and an L-band wavelength $\lambda_{Ln}$ are assigned to a port that is communicatively coupled to the TEE#n via an optical fiber.

The TEE 2 may be an example of another communication device and includes a T-LD 21, a receiver (Rx) 22, a C/L coupler 23, and a wavelength setting control unit 24. The C/L coupler 23 demultiplexes or multiplexes L-band downstream signal light and C-band upstream signal light. The Rx 22 performs reception processing on the received data 111. For example, the Rx 22 performs reception processing on the data 111 transmitted from the HEE 1 and demultiplexed in the C/L coupler 23. The data 111 is user data that is transmitted from the HEE 1 to the TEE 2. The Rx 22 outputs information on a wavelength control signal (control signal) 112 transmitted from the HEE 1 through the OM/OD 3 to the wavelength setting control unit 24. The wavelength control signal 112 is a control signal that is set by the TEE wavelength setting control unit 17 of the HEE 1 for the purpose of correcting wavelength deviation as the wavelength of signal light output by the T-LD 21 deviates. As the wavelength control signal 112, for example, a signal of a method in which an AM tone or the like is superimposed on signal light, or a signal of a method in which it is integrated as an overhead portion into a frame of signal light, may be applied.

The wavelength setting control unit 24 controls the wavelength of an optical signal to be output by the T-LD 21. For example, based on the wavelength control signal 112 input from the Rx 22, the wavelength setting control unit 24 controls the wavelength of an optical signal to be output by the T-LD 21 so that the wavelength has a wavelength (refer to FIG. 3 and FIG. 4) corresponding to a port of the OM/OD 3 to which the TEE 2 is coupled. The T-LD 21 may be an example of a wavelength-tunable light source and outputs an optical signal of a wavelength controlled by the wavelength setting control unit 24. Signal light that is output by the T-LD 21 may be, for example, laser light.

The HEE 1 may be an example of a communication device and includes a transmitter array (Tx array) 11, a receiver array (Rx array) 12, AWGs 13, 14, a C/L coupler 15, an optical power monitor information collection unit 16, and a TEE wavelength setting control unit 17. The C/L coupler 15 demultiplexes or multiplexes L-band downstream signal light and C-band upstream signal light.

The AWG 14 may be an example of an optical filter and divides a C-band upstream DWDM signal into signal light of n wavelengths and inputs the divided signal light of the plurality of wavelengths to the Rx array 12. The Rx array 12 may be an example of a receiving unit and includes n receivers (HEE Rx#1 to #n) 120 that correspond to n C-band wavelength grid points $\lambda_{C1}$ to $\lambda_{Cn}$ (refer to FIG. 3 and FIG. 4), respectively. A wavelength grid point is a band with a margin with respect to a certain wavelength. For example, the wavelength grid point $\lambda_{Ck}$ indicates a band with margins before and after the value of a wavelength $\lambda_{Ck}$. For example, the wavelength grid point is a partial band in a continuous band including a given wavelength.

Hereinafter, when one of a plurality of HEE Rxs is specified, this HEE Rx is denoted as "HEE Rx#1", "HEE Rx#k", "HEE Rx#n", or the like, and when any HEE Rx is referred to, this HEE Rx is denoted as "HEE Rx 120". The HEE Rx 120 may be an example of the receiving unit and includes a data receiving unit 121, a received light power monitor unit 122, a photo diode (PD) 123, a linear amplifier 124, and a logarithmic amplifier 125.

The PD 123 may be an example of a converter and performs photoelectric conversion (optical-electrical conversion) of input signal light. For example, the PD 123 performs photoelectric conversion of signal light input from the AWG 14 and outputs a signal produced through photoelectric conversion to the linear amplifier 124 and the logarithmic amplifier 125. The linear amplifier 124 amplifies a signal input from the PD 123 and outputs the amplified signal to the data receiving unit 121.

The data receiving unit 121 may be an example of a reception processing unit and performs reception processing on a signal received from the TEE 2. For example, the data receiving unit 121 performs reception processing on a signal amplified by the linear amplifier 124. The logarithmic amplifier 125 amplifies a signal input from the PD 123 and outputs the amplified signal to the received light power monitor unit 122. The logarithmic amplifier 125 is slower in response speed than the linear amplifier 124 and therefore is not capable of reading a data stream at high speed; however, the logarithmic amplifier 125 detects the power of low-level signal light.

The received light power monitor unit 122 may be an example of a power detector and detects (or monitors) the power of signal light received from the TEE 2. For example, based on a signal amplified by the logarithmic amplifier 125, the received light power monitor unit 122 detects the power of signal light output from the AWG 14. The received light power monitor unit 122 outputs information on the detected power (power monitor information) to the optical power monitor information collection unit 16.

The optical power monitor information collection unit 16 collects plural pieces of power monitor information output from the Rx array 12. For example, the optical power monitor information collection unit 16 identifies an HEE Rx 120 that has detected the power of received signal light, out of n HEE Rxs 120, and collects the power monitor information detected and output by the identified HEE Rx 120. The TEE wavelength setting control unit 17 may be an example of a transmitting unit and produces the wavelength control signal 112. For example, the TEE wavelength setting control unit 17 produces the wavelength control signal 112 based on power monitor information collected by the optical power monitor information collection unit 16.

The TX array 11 includes n transmitters (HEE Tx#1 to #n) 110, which correspond to n L-band wavelength grid points $\lambda_{L1}$ to $\lambda_{Ln}$ (refer to FIG. 3 and FIG. 4), respectively. Hereinafter, when one of a plurality of HEE Txs is specified, this HEE Tx is denoted as "HEE Tx#1", "HEE Tx#k", "HEE Tx#n", or the like, and when any HEE Tx is referred to, this HEE Tx is denoted as "HEE Tx 110".

The HEE Tx 110 may be an example of the transmitting unit and includes an LD 113. The LD 113 outputs modulated light to the AWG 13 based on the data 111 or the wavelength control signal 112 that is input to the LD 113. The AWG 13 multiplexes n pieces of signal light output from the Tx array 11 and output them to the C/L coupler 15.

FIG. 3 and FIG. 4 each illustrate an example of wavelength deviation in the communication system. In FIG. 3, a wavelength monitor process for signal light in the HEE Rx#k is illustrated, and, in FIG. 4, a wavelength monitor process for signal light in an Rx#k+2 is illustrated. In FIG. 3 and FIG. 4, illustration of the optical power monitor information collection unit 16 and the TEE wavelength setting control unit 17 included in the HEE 1 is omitted for brevity.

In FIG. 3, the T-LD 21 of the TEE#k outputs signal light of a wavelength $\lambda_{Ck+2}$, which deviates from the wavelength $\lambda_{Ck}$ corresponding to a port of the OM/OD 3 to which the TEE#k is coupled (refer to reference character A1 of FIG. 2). Hereinafter, the wavelength (the wavelength $\lambda_{Ck}$ in the TEE#k of FIG. 3 and FIG. 4) that corresponds to a port of the OM/OD 3 to which the TEE 2 is coupled is sometimes referred to as "a desired wavelength" or the like.

The cyclic AWG 31 transmits signal light of the wavelength grid point $\lambda_{Ck}$, out of signal light input from a port to which the TEE#k is coupled (refer to reference character A2 of FIG. 3). The signal light that has passed through the cyclic AWG 31 includes signal light of the wavelength $\lambda_{Ck}$ and signal light of the wavelength $\lambda_{Ck+2}$ (refer to reference character A3 of FIG. 3). The signal light of the wavelength $\lambda_{Ck}$ is signal light of a tail component, which is a band other than the band of a signal modulated by the T-LD 21, and is signal light in the pass band of the cyclic AWG 31. The signal light of the wavelength $\lambda_{Ck+2}$ is signal light in a band of a signal modulated with the wavelength deviating because of inadequate setting of the T-LD 21 and is leakage light from the cyclic AWG 31. The scale of the waveform graph of signal light indicated by reference character A3 is larger than the scale of the waveform graph of signal light indicated by reference character A1. Consequently, in the waveform graph indicated by reference character A3, the component of the wavelength grid point $\lambda_{Ck}$, which is not represented in the waveform graph indicated by reference character A1, is represented.

The AWG 14 inputs signal light of the wavelength $\lambda_{Ck}$, out of signal light output from the TEE 2, to the corresponding HEE Rx#k (refer to reference character A2 of FIG. 3). The HEE Rx#k detects power smaller than a threshold at the wavelength grid point $\lambda_{Ck}$ because of the wavelength deviation of signal light output by the T-LD 21 (refer to reference character A4 of FIG. 3). The threshold may be set, for example, based on the power of signal light output by the T-LD 21. The HEE Rx#k outputs information on the detected power as power monitor information to the optical power monitor information collection unit 16. The scale of the waveform graph of signal light indicated by reference character A4 may be substantially the same as the scale of the waveform of signal light indicated by reference character A3.

As illustrated in FIG. 3, the AWG 14 inputs signal light of the wavelength $\lambda_{Ck+2}$, out of signal light output from the TEE 2, to the corresponding HEE Rx#k+2 (refer to reference character B1 of FIG. 4). The HEE Rx#k+2 detects power smaller than the threshold at a wavelength grid point $\lambda_{Ck+2}$ due to wavelength deviation of signal light output by the T-LD 21 (refer to reference character B2 of FIG. 4). The HEE Rx#k+2 outputs information on the detected power as power monitor information to the optical power monitor information collection unit 16.

For example, the optical power monitor information collection unit 16 illustrated in FIG. 2 collects power monitor information from the HEE Rx#k, #k+2. For example, the TEE wavelength setting control unit 17 illustrated in FIG. 2 produces the wavelength control signal 112 based on the power monitor information collected by the optical power monitor information collection unit 16. In FIG. 3 and FIG.

4, by the Rx array 12, a signal of the desired wavelength $\lambda_{Ck}$ with power smaller than the threshold and a signal of the wavelength $\lambda_{Ck+2}$, which deviates from the desired wavelength, with power smaller than the threshold are detected. Therefore, the TEE wavelength setting control unit 17 determines that the T-LD 21 outputs signal light of the wavelength $\lambda_{Ck+2}$, which deviates from the desired waveform. The TEE wavelength setting control unit 17 produces the waveform control signal 112 for causing the wavelength setting control unit 24 to perform control so that the wavelength of signal light output by the T-LD 21 shifts from the wavelength $\lambda_{Ck+2}$ to the desired wavelength $\lambda_{Ck}$.

For example, when, although the T-LD 21 outputs signal light, the wavelength of the signal received by the HEE 1 deviates outside the grid point of the desired wavelength, the TEE wavelength setting control unit 17 detects the amount of deviation of the wavelength, based on the power of signal light detected by each HEE Rx 120. Since a given wavelength grid point is assigned to each HEE Rx 120, the TEE wavelength setting control unit 17 detects a difference between the desired wavelength and the wavelength of signal light received by the HEE 1, based on power monitor information from each HEE Rx 120.

The TEE wavelength setting control unit 17 inputs the produced wavelength control signal 112 to the HEE Tx 110 corresponding to the desired wavelength $\lambda_{Ck}$. The wavelength monitor process of signal light in the HEE Rx#k+2 in FIG. 4 may be omitted. For example, the TEE wavelength setting control unit 17 may perform the wavelength adjust process using only power monitor information obtained by the wavelength monitor process of signal light in the HEE Rx#k in FIG. 3.

Figure 5:
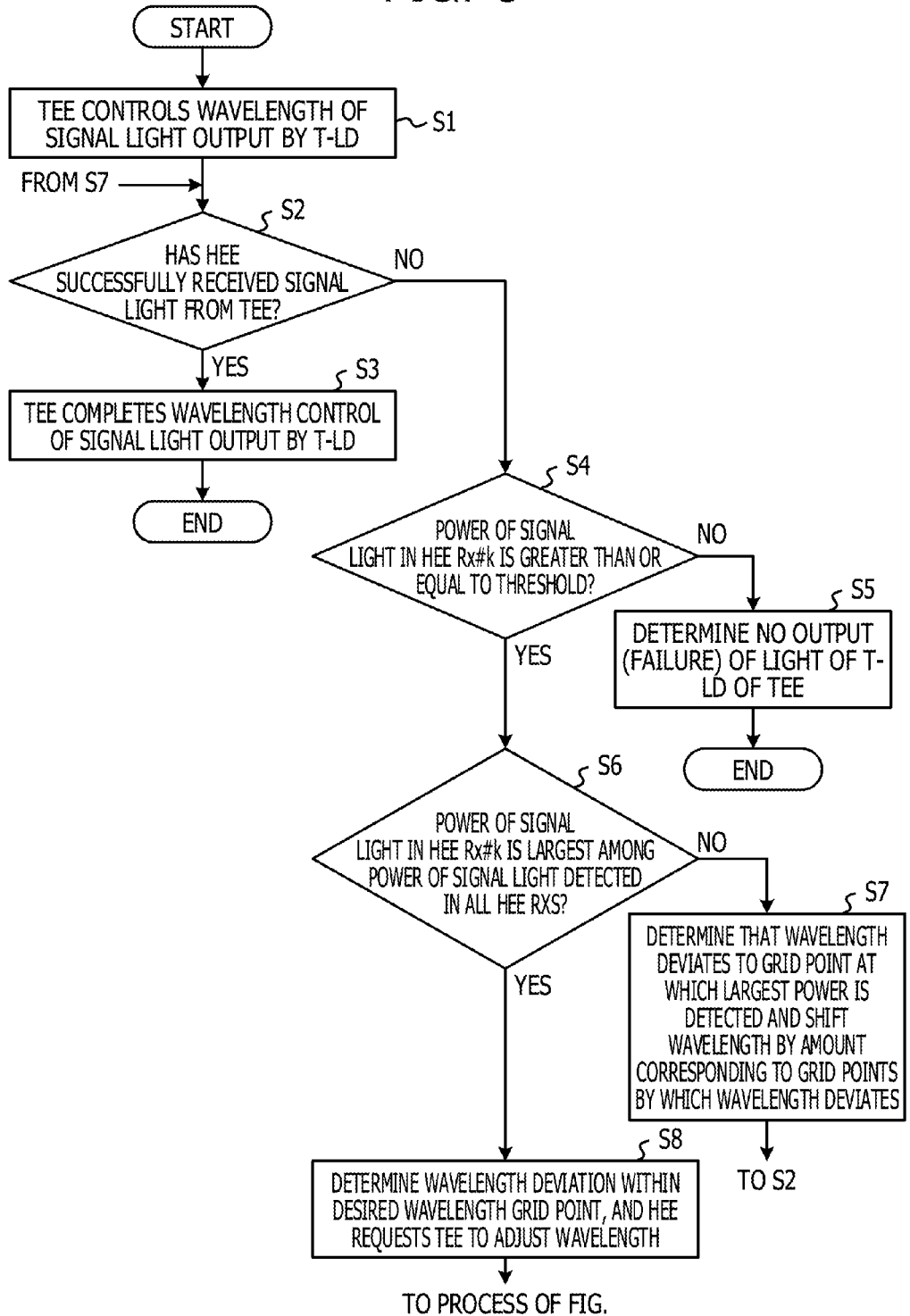
FIG. 5 illustrates an example of a wavelength monitor process in the communication system.

FIG. 5 illustrates an example of a wavelength monitor process. The wavelength monitor process in the communication system described above may correspond to the flowchart (operations S1 to S8) illustrated in FIG. 5. The wavelength setting control unit 17 of the TEE 2 controls the wavelength of signal light to be output by the T-LD 21 so that the signal light has a wavelength corresponding to a port of the OM/OD 3 to which the TEE 2 is coupled (operation S1).

The receiving unit 121 of the HEE Rx#k determines whether the data receiving unit 121 has successfully received signal light transmitted from the TEE 2 (operation S2). For example, the power of a signal to be subjected to reception processing performed by the data receiving unit 121 being greater than or equal to a threshold may be an example of successful reception of signal light. If the signal light is successfully received (refer to the Yes route in operation S2), the TEE 2 completes the process of controlling the wavelength of the signal light output by the T-LD 21 (operation S3) and the process ends.

If the signal light is not successfully received (refer to the No route in operation S2), the received light power monitor unit 122 of the HEE Rx#k determines whether the power of signal light transmitted from the TEE 2 is greater than equal to a threshold (operation S4). If the power of signal light is less than the threshold (refer to the No route in operation S4), the received light power monitor unit 122 of the HEE Rx#k determines that no signal light is output by the T-LD 21 of the TEE 2 (the T-LD 21 is in failure) (operation S5). The process ends.

If the power of signal light is greater than or equal to the threshold (refer to the Yes route in operation S4), the TEE wavelength setting control unit 17 determines that the power of the signal light detected in the HEE Rx#k is largest among the power of signal light detected in all the HEE Rxs 120 (operation S6). If the power of the signal light detected in the HEE Rx#k is not largest among the power of signal light detected in all the HEE Rxs 120 (refer to the No route in operation S6), the TEE wavelength setting control unit 17 determines that the wavelength deviates to a grid point at which the largest power is detected. The TEE wavelength setting control unit 17 controls the wavelength control signal 112 and thereby performs control so that the wavelength of the signal light to be output by the T-LD 21 of the TEE 2 shifts by an amount corresponding to grid points by which the wavelength deviates (operation S7). The process returns to operation S2.

If the power of the signal light detected in the HEE Rx#k is largest among the power of signal light detected in all the HEE Rxs 120 (refer to the Yes route in operation S6), the TEE wavelength setting control unit 17 determines that wavelength deviation within a desired wavelength grid point has occurred. The TEE wavelength setting control unit 17 controls the wavelength control signal 112 and thereby requests the TEE 2 to adjust the set wavelength (operation S8). The process proceeds to a wavelength adjustment process in FIG. 6.

Figure 6:
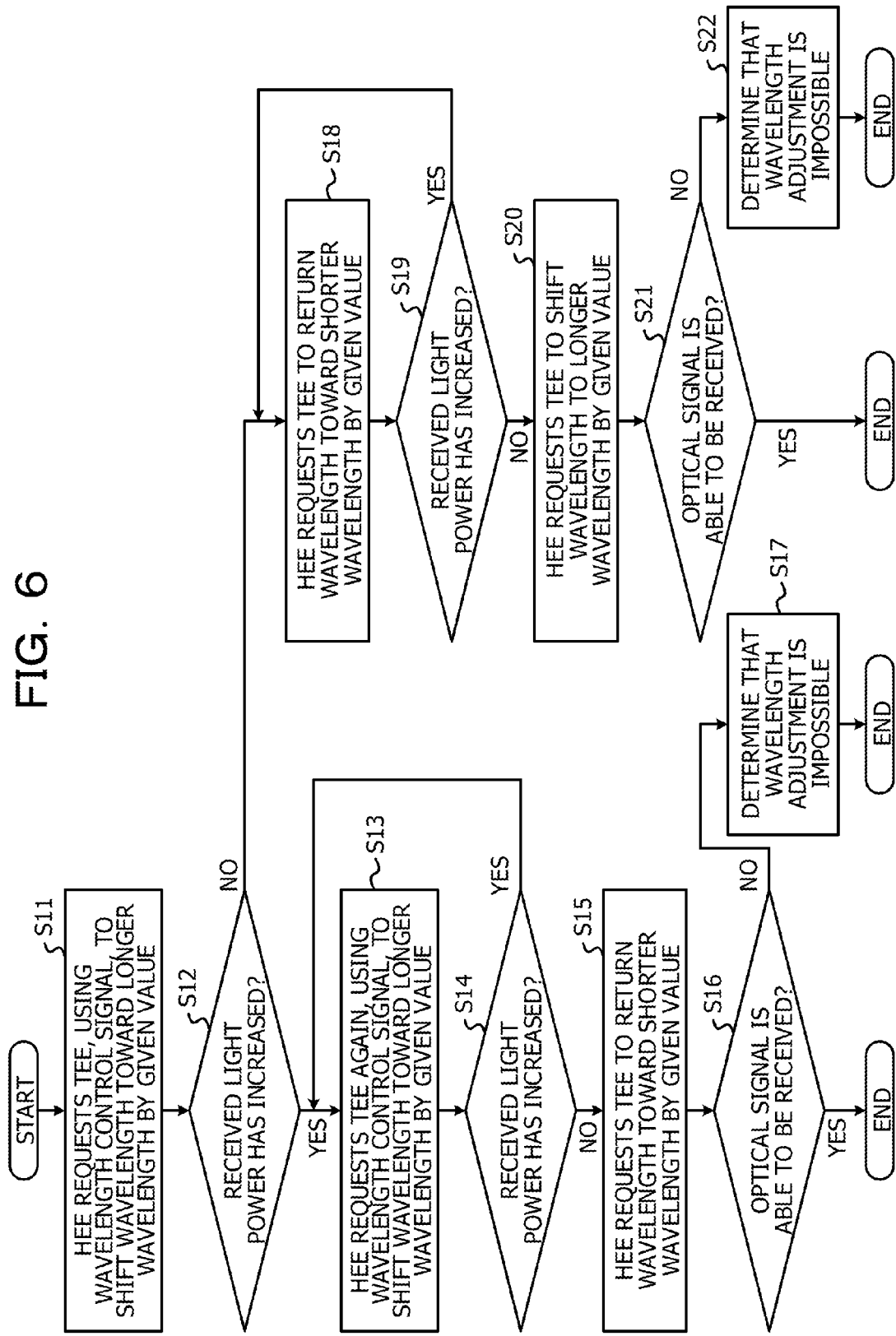
FIG. 6 illustrates an example of a wavelength adjustment process in the communication system.

FIG. 6 illustrates an example of a wavelength adjustment process. The wavelength adjustment process in the communication system described above may correspond to the flowchart (operations S11 to S22) illustrated in FIG. 6. The TEE wavelength setting control unit 17 of the HEE 1 requests the TEE 2, using the wavelength control signal 112, to shift the wavelength of the signal light to be output by the T-LD 21 toward a longer wavelength by a given value (for example, by a minimum wavelength set value of the T-LD 21) (operation S11).

The received light power monitor unit 122 of the HEE Rx#k determines whether the power of received signal light has increased (operation S12). If the power of the received signal light has increased (refer to the Yes route in operation S12), the TEE wavelength setting control unit 17 of the HEE 1 requests the TEE 2 again, using the wavelength control signal 112, to shift the wavelength of the signal light to be output by the T-LD 21 toward a longer wavelength by a given value (operation S13).

The received light power monitor unit 122 of the HEE Rx#k determines whether the power of received signal light has increased (operation S14). If the power of the received signal light has increased (refer to the Yes route in operation S14), the process returns to operation S13, where operations S13 and S14 are repeatedly performed. If the power of the received signal light has not increased (refer to the No route in operation S14), the TEE wavelength setting control unit 17 of the HEE 1 requests the TEE 2 to return the wavelength of the signal light to be output by the T-LD 21 toward a shorter wavelength by a given value (operation S15).

The data reception unit 121 of the HEE Rx#k determines whether to be able to receive an optical signal (operation S16). It may be an example of successful reception of signal light that the data reception unit 121 demodulates a signal to be subjected to reception processing. If an optical signal is able to be received (refer to the Yes route in operation S16), the process ends.

If an optical signal is not able to be received (refer to the No route in operation S16), the HEE 1 determines that it is impossible to adjust the output wavelength of the TEE 2 (operation S17), and the process ends. In operation S12, if the power of the received signal light has not increased (refer to the No route in operation S12), the TEE wavelength setting control unit 17 of the HEE 1 requests the TEE 2 to shift the wavelength of the signal light to be output by the T-LD 21 toward a shorter wavelength by a given value (operation S18).

The received light power monitor unit 122 of the HEE 1 determines whether the power of the received signal light has increased (operation S19). If the power of the received signal light has increased (refer to the Yes route in operation S19), the process returns to operation S18, where the process in operations S18 and S19 is repeatedly performed. If the power of the received signal light has not increased (refer to the No route in operation S19), the TEE wavelength setting control unit 17 of the HEE 1 requests the TEE 2 to shift the wavelength of the signal light to be output by the T-LD 21 toward a longer wavelength by a given value (operation S20).

The data receiving unit 121 of the HEE Rx#k determines whether to be able to receive an optical signal (operation S21). It may be an example of successful reception of signal light that the data receiving unit 121 demodulates a signal to be subjected to reception processing. If an optical signal is able to be received (refer to the Yes route in operation S21), the process ends.

If an optical signal is not able to be received (refer to the No route in operation S21), the HEE 1 determines that it is impossible to adjust the output wavelength of the TEE 2 (operation S22), and the process ends.

The received light power monitor unit 122 detects the power of signal light output by the AWG 14 based on a signal amplified by the logarithmic amplifier 125. When signal light is not successfully received in reception processing performed by the data receiving unit 121, based on the power detected in the received light power monitor unit 122, the TEE wavelength setting control unit 17 controls the wavelength control signal 112 so that the TEE 2 controls the wavelength of signal light to be output by the T-LD 21. Therefore, it may be determined whether a failure has occurred in the TEE 2 or the wavelength deviation of output signal light has occurred. Management of the communication system 100 may be easily performed.

When the power of signal light of a wavelength other than a given wavelength is largest among plural pieces of power detected for a plurality of wavelengths, respectively, based on a difference between the given wavelength and the wavelength of signal light having the largest power, the TEE wavelength setting control unit 17 sets the wavelength control signal 112 so as to control the wavelength of signal light to be output by the TEE 2. Therefore, even when the wavelength deviation of signal light output by the TEE 2 outputs is large, adjustment for wavelength deviation may be easily performed.

When the power of signal light of a given wavelength is largest among plural pieces of power detected for a plurality of wavelengths, respectively, the TEE wavelength setting control unit 17 repeatedly transmits, to the TEE 2, the wavelength control signal 112 that is set to change the wavelength of signal light to be output by the TEE 2, by a given amount so that the power of signal light of the given wavelength increases. Therefore, even when the wavelength deviation of signal light output by the TEE 2 is insignificant, adjustment for wavelength deviation may be easily performed.

If the power of output signal light is less than or equal to a first threshold, the received light power monitor unit 122 determines that no signal light is output by the TEE 2. If the power of signal light from which a signal to be subjected to reception processing derives is less than or equal to a second threshold, the data receiving unit 121 determines that signal light is not successfully received. Therefore, a failure in the TEE 2 may be determined.

Figure 7:
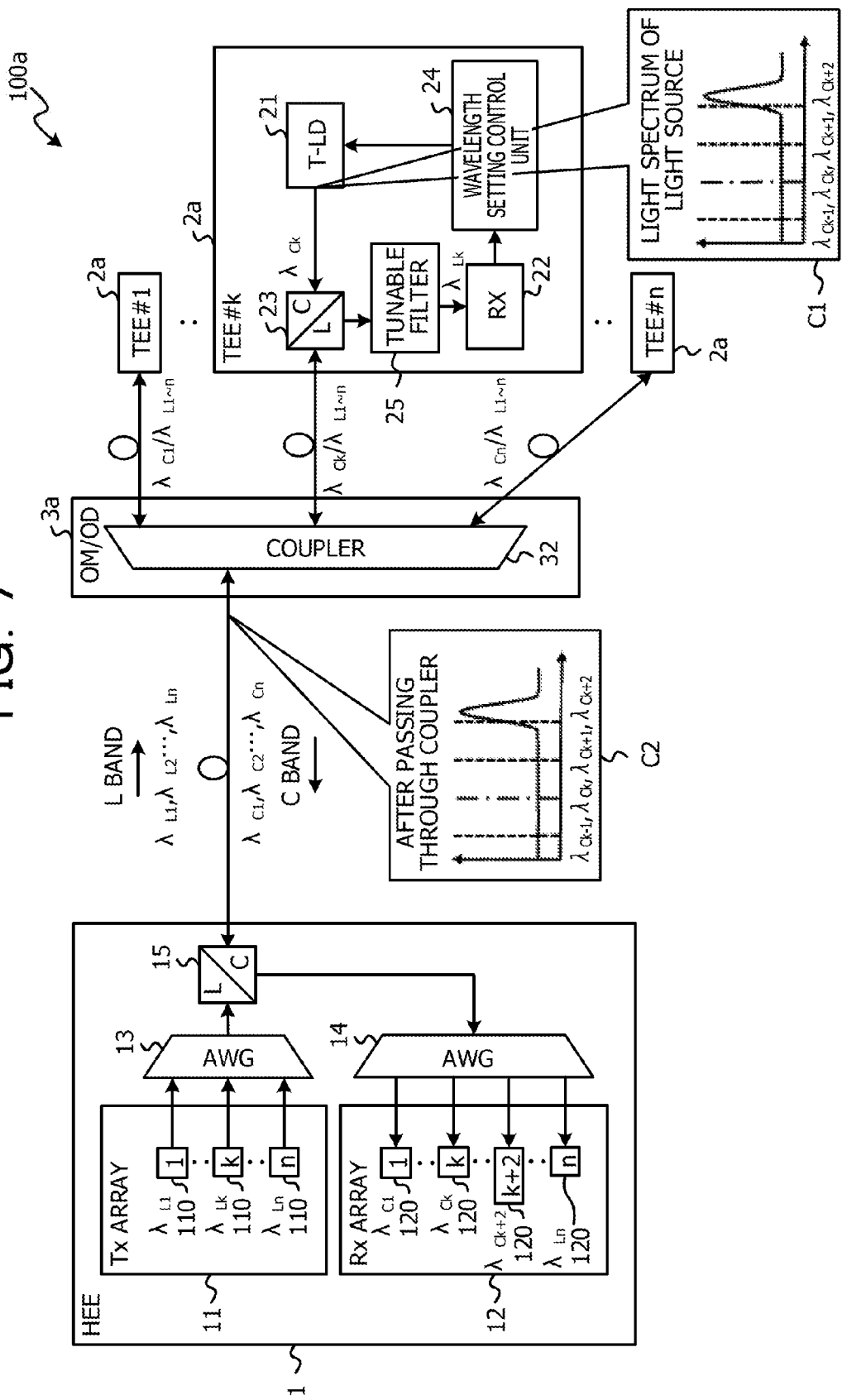
FIG. 7 illustrates an example of wavelength deviation in a communication system.
Figure 8:
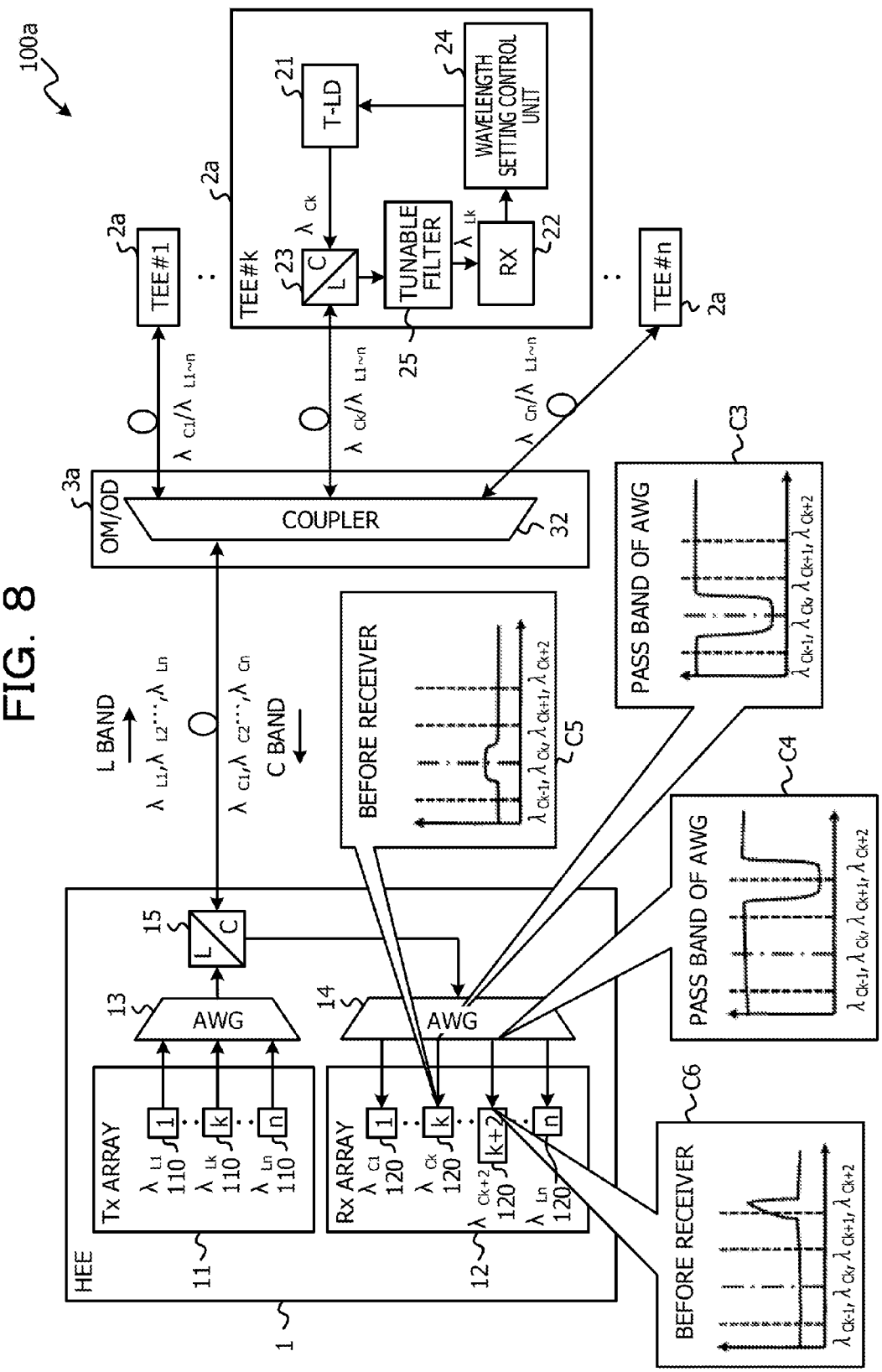
FIG. 8 illustrates an example of wavelength deviation in the communication system.

Each configuration and each process described above may be selected if desired or appropriately combined. FIG. 7 and FIG. 8 each illustrate an example of wavelength deviation in a communication system.

A communication system 100*a* illustrated in FIG. 7 and FIG. 8 includes an OM/OD 3*a* and *n* pieces of TEE (TEE#1 to #n) 2*a*, which are provided instead of the OM/OD 3 and the n pieces of TEE 2 included in the communication system 100 illustrated in FIG. 2 and other drawings, respectively. The HEE 1 illustrated in FIG. 7 and FIG. 8 includes a functional configuration similar to that of the HEE 1 illustrated in FIG. 2 and other drawings and therefore the description thereof may be omitted. In FIG. 7 and FIG. 8, illustration of the optical power monitor information collection unit 16 and the TEE wavelength setting control unit 17 included in the HEE 1 is omitted for brevity.

The OM/OD 3*a* includes a coupler 32 instead of the cyclic WAG 31 included in the OM/OD 3 illustrated in FIG. 2 and other drawings. The coupler 32 demultiplexes or multiplexes signal light. The coupler 32, which is different from the cyclic AWG 31 illustrated in FIG. 2 and other drawings, does not have to include a function of performing wavelength division of signal light. The TEE 2*a* includes the T-LD 21, the receiver (Rx) 22, the C/L coupler 23, the wavelength setting control unit 24 and a tunable filter 25.

The tunable filter 25 includes, instead of a wavelength division function for a downstream signal of the cyclic AWG 31 illustrated in FIG. 2 and other drawings, a function of transmitting only signal light of a wavelength corresponding to a port of the OM/OD 3*a* to which the TEE 2*a* is coupled, out of downstream signals that are wavelength multiplexed signals received by the TEE 2*a*. For example, the tunable filter 25 of the TEE#k transmits only signal light of the wavelength $\lambda_{Lk}$ out of the received downstream signals.

For upstream signals, signal light of wavelengths other than a desired wavelength is combined in the OM/OD 3*a*, and therefore there is a possibility that signal light at a desired wavelength grid point affects signal light of wavelengths of the different grid points. Therefore, for example, during the wavelength monitor process and the wavelength adjustment process, the T-LD 21 may reduce the power of signal light to be output so that signal light of a desired wavelength grid point does not affect the signal light of wavelengths of other grid points.

In FIG. 7, the wavelength of signal light output by the T-LD 21 of the TEE 2 deviates from the grid point of the desired wavelength $\lambda_{Ck}$ to the grid point of the wavelength $\lambda_{Ck+2}$ (refer to reference character C1 of FIG. 7). The coupler 32 of the OM/OD 3*a* has no wavelength filtering property and therefore transmits signal light transmitted from the TEE 2*a* as is (refer to reference character C2 in FIG. 7). The scale of the waveform graph of signal light indicated by reference character C2 is substantially the same as the scale of the waveform graph of signal light indicated by reference character C1.

As illustrated in FIG. 8, the AWG 14 of the HEE 1 inputs, out of signal light output from the TEE 2, signal light of the wavelength $\lambda_{Ck}$ to the corresponding HEE Rx#k (refer to reference character C3 in FIG. 8) and inputs signal light of the wavelength $\lambda_{Ck+2}$ to the corresponding HEE Rx#k+2 (refer to reference character C4 in FIG. 8). The HEE Rx#k detects power smaller than a threshold at the wavelength grid point $\lambda_{Ck}$ because of wavelength deviation of signal light output by the T-LD 21 (refer to reference character C5 in FIG. 8). The HEE Rx#k+2 detects power smaller than the threshold at the wavelength grid point $\lambda_{Ck+2}$ because of wavelength deviation of signal light output by the T-LD 21 (refer to reference character C6 in FIG. 8). The scale of the waveform graphs of signal light indicated by reference characters C5 and C6 is larger than the scale of the waveform graphs of signal light indicated by reference characters C1 and C2. Consequently, in the waveform graph indicated by reference character C5, the component of the wavelength grid point $\lambda_{Ck}$, which is not represented in the waveform graphs indicated by reference characters C1 and C2, is represented.

In the communication system 100a, the wavelength monitor process and the wavelength adjustment process are performed as in the communication system 100, and advantages as in the communication system 100 may be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication device that receives received signal light from another communication device, the communication device comprising:
    a receiver configured to receive signal light output from an optical filter that outputs signal light of a given wavelength included the received signal light; and
    a transmitter configured to transmit, to the another communication device, signal light including a control signal for controlling a wavelength of laser light for use in generation of the signal light of the given wavelength,
    wherein the receiver is configured to detect power of the signal light output from the optical filter; and the transmitter is configured to set, when the signal light which is received in the receiver is less than or equal to a first threshold, the control signal so as to cause the another communication device to control the wavelength of the laser light, based on the power,
    wherein the receiver includes:
        a converter configured to perform photoelectric conversion of the signal light output from the optical filter;
        a linear amplifier, coupled to the converter, configured to amplify a photoelectric-converted signal;
        a reception processor, coupled to an output of the linear amplifier, configured to perform reception processing on an amplified signal;
        a logarithmic amplifier, coupled to the converter in parallel with the linear amplifier, configured to receive the photoelectric-converted signal along with the linear amplifier and amplify the photoelectric-converted signal; and
        a power detector, coupled to an output of the logarithmic amplifier, configured to detect power of the signal light output from the optical filter based on the amplified signal amplified by the logarithmic amplifier.

2. The communication device according to claim 1, wherein the optical filter outputs signal light of a plurality of wavelengths included in the received signal light, the receiver includes a plurality of sub-receivers corresponding to the plurality of wavelengths, respectively, and each of the plurality of sub-receivers includes the converter, the linear amplifier, the reception processor, the logarithmic amplifier and the power detector.

3. The communication device according to claim 2, wherein the transmitter, when power of signal light of a wavelength other than the given wavelength is largest among the plurality of wavelengths, is configured to set the control signal based on a difference between the given wavelength and the wavelength of the signal light having the largest power.

4. The communication device according to claim 2, wherein the transmitter, when power of the signal light of the given wavelength is largest among the plurality of wavelengths is configured to set the control signal so as to increase the power of the signal power of the given wavelength.

5. The communication device according to claim 4, wherein the transmitter is configured to repeatedly transmit the control signal to the another communication device.

6. The communication device according to claim 1, wherein the transmitter includes a laser diode configured to generate the signal light including the control signal based the control signal and data to be transmitted from the communication device to the another communication device.

7. The communication device according to claim 6, wherein the power detector, when the power of the signal power from the optical filter is less than or equal to a second threshold, is configured to determine that the laser light is not output by the another communication device.

8. A wavelength adjustment method comprising:
    receiving signal light of a given wavelength in a receiver, through an optical filter, included in received signal light output by another communication device;
    detecting power of the signal light output from the optical filter;
    setting, when the signal light which is received in the receiver is less than or equal to a first threshold, a control signal for controlling a wavelength of laser light for use in generation of the signal light of the given wavelength so as to cause the another communication device to control the wavelength of the laser light, based on the power; and
    transmitting the control signal to the another communication device,
    wherein the receiver:
        performs, using a converter, photoelectric conversion of the signal light output from the optical filter;
        amplifies, using a linear amplifier coupled to the converter, a photoelectric-converted signal;
        performs, using a reception processor coupled to an output of the linear amplifier, reception processing on an amplified signal;
        receives, using a logarithmic amplifier coupled to the converter in parallel with the linear amplifier, the photoelectric-converted signal along with the linear amplifier and amplifies the photoelectric-converted signal; and
        detects, using a power detector coupled to an output of the logarithmic amplifier, power of the signal light output from the optical filter based on the amplified signal amplified by the logarithmic amplifier.

9. The wavelength adjustment method according to claim 8, further comprising:
performing photoelectric conversion on signal light output from the optical filter;
amplifying a signal obtained by the photoelectric conversion by a logarithmic amplifier; and
detecting, based on the signal amplified by the logarithmic amplifier, power of the signal power output from the optical filter.

10. The wavelength adjustment method according to claim 8, wherein signal light of a plurality of wavelengths is received through the optical filter from the another communication device, and the control signal, when power of the signal light of the given wavelength is largest among the plurality of wavelengths, the control signal is set so as to increase the power of the signal light of the given wavelength.

11. The wavelength adjustment method according to claim 10, wherein the control signal is repeatedly transmitted to the another communication device.

12. The wavelength adjustment method according to claim 8, further comprising:
determining, when power of signal light output from the optical filter is less than or equal to a second threshold, that the laser light is not output by the another communication device.

13. A communication device that receives received signal light from another communication device, the communication device comprising:
a receiver configured to receive signal light output from an optical filter that outputs signal light of a given wavelength included the received signal light; and
a transmitter configured to transmit, to the another communication device, a control signal for controlling a wavelength of laser light for use in generation of the signal light of the given wavelength,
wherein the receiver is configured to detect power of the signal light output from the optical filter; and the transmitter is configured to set, when the signal light which is received in the receiver is less than or equal to a first threshold, the control signal so as to cause the another communication device to control the wavelength of the laser light, based on the power,
wherein the optical filter outputs signal light of a plurality of wavelengths included in the received signal light, and the receiver includes a plurality of sub-receivers corresponding to the plurality of wavelengths, respectively,
wherein each of the sub-receivers includes:
a converter configured to perform photoelectric conversion of the signal light output from the optical filter;
a linear amplifier configured to amplify a photoelectric-converted signal;
a reception processor configured to perform reception processing on an amplified signal;
a logarithmic amplifier configured to amplify the photoelectric-converted signal; and
a power detector configured to detect power of the signal light output from the optical filter based on the amplified signal amplified by the logarithmic amplifier.

14. The communication device according to claim 13, wherein the transmitter, when power of signal light of a wavelength other than the given wavelength is largest among the plurality of wavelengths, is configured to set the control signal based on a difference between the given wavelength and the wavelength of the signal light having the largest power.

15. The communication device according to claim 13, wherein the transmitter, when power of the signal light of the given wavelength is largest among the plurality of wavelengths is configured to set the control signal so as to increase the power of the signal power of the given wavelength.

* * * * *